(12) United States Patent
Weng et al.

(10) Patent No.: US 11,606,415 B2
(45) Date of Patent: Mar. 14, 2023

(54) METHOD, APPARATUS AND SYSTEM FOR PROCESSING AN ACCESS REQUEST IN A CONTENT DELIVERY SYSTEM

(71) Applicant: GUIZHOU BAISHANCLOUD TECHNOLOGY CO., LTD., Guiyang (CN)

(72) Inventors: Jianhong Weng, Guiyang (CN); Shaoyang Wang, Guiyang (CN); Shaojun Cai, Guiyang (CN); Chunfu Huang, Guiyang (CN); Xiongwei Wang, Guiyang (CN)

(73) Assignee: GUIZHOU BAISHANCLOUD TECHNOLOGY CO., LTD., Guiyang (CN)

( * ) Notice: Subject to any disclaimer, the term of this patent is extended or adjusted under 35 U.S.C. 154(b) by 0 days.

(21) Appl. No.: 17/631,120

(22) PCT Filed: Jul. 22, 2020

(86) PCT No.: PCT/CN2020/103439
§ 371 (c)(1),
(2) Date: Jan. 28, 2022

(87) PCT Pub. No.: WO2021/017968
PCT Pub. Date: Feb. 4, 2021

(65) Prior Publication Data
US 2022/0279036 A1 Sep. 1, 2022

(30) Foreign Application Priority Data
Jul. 30, 2019 (CN) .......................... 201910694947.X (51) Int. Cl.
*H04L 67/10* (2022.01)
*H04L 67/06* (2022.01)
(Continued)

(52) U.S. Cl.
CPC .............. *H04L 67/06* (2013.01); *G06F 16/13* (2019.01); *H04L 65/40* (2013.01); *H04L 67/10* (2013.01)

(58) Field of Classification Search
None
See application file for complete search history.

(56) References Cited

U.S. PATENT DOCUMENTS

| 10,331,630 B1 | 6/2019 | Da Silveira Junior et al. |
| 10,397,369 B2 | 8/2019 | Zhu |

(Continued)

FOREIGN PATENT DOCUMENTS

| CN | 101039329 A | 9/2007 |
| CN | 101137042 A | 3/2008 |

(Continued)

OTHER PUBLICATIONS

The World Intellectual Property Organization (WIPO) International Search Report for PCT/CN2020/103439 dated Oct. 28, 2020 7 Pages.

(Continued)

*Primary Examiner* — Quang N Nguyen
(74) *Attorney, Agent, or Firm* — Anova Law Group, PLLC (57) ABSTRACT

An access request processing method for a content delivery system includes obtaining a file access request; judging, according to a preset unpopular file judgment policy, whether a file corresponding to the file access request is an unpopular file; in response to determining that the file is an unpopular file, judging whether bandwidth usage state information obtained in advance conforms to a preset judgment policy for full use of bandwidth; and triggering, in response to determining that the bandwidth usage state information conforms to the judgment policy, an unpopular file manage- (Continued)

ment node to respond to the file access request. The unpopular file management node stores the file corresponding to the file access request.

13 Claims, 4 Drawing Sheets

(51) Int. Cl.
*G06F 16/13* (2019.01)
*H04L 65/40* (2022.01)

(56) References Cited

U.S. PATENT DOCUMENTS

| | | | |
|---|---|---|---|
| 10,489,980 B1* | 11/2019 | Canavor | G06T 3/40 |
| 2011/0289345 A1* | 11/2011 | Agesen | G06F 11/2097 |
| | | | 714/4.11 |
| 2015/0242397 A1 | 8/2015 | Zhuang | |
| 2017/0279916 A1 | 9/2017 | Kovacs et al. | |
| 2022/0050722 A1* | 2/2022 | Du | G06F 9/5016 |
| 2022/0329672 A1* | 10/2022 | Lv | H04L 67/60 |

FOREIGN PATENT DOCUMENTS

| | | |
|---|---|---|
| CN | 102438171 A | 5/2012 |
| CN | 102523279 A | 6/2012 |
| CN | 103746934 A | 4/2014 |
| CN | 105072172 A | 11/2015 |
| CN | 107211035 A | 9/2017 |
| CN | 109218362 A | 1/2019 |
| CN | 109672757 A | 4/2019 |
| CN | 109688432 A | 4/2019 |

OTHER PUBLICATIONS

The State Intellectual Property Office of People's Republic of China The First Office Action for CN 201910694947.X dated Jun. 25, 2021 17 pages (with translation).
The State Intellectual Property Office of People's Republic of China The Second Office Action for CN 201910694947.X dated Jan. 13, 2022 8 pages (with translation).
Zhicheng Ge et al., "A Hierarchical Cooperative Caching Strategy for Mobile Content Delivery Network", Chinese Journal of Computers, Oct. 16, 2018, vol. 41 No 12.
Kai Xu et al., "Joint Replica Server Placement, Content Caching, and Request Load Assignment in Content Delivery Networks", IEEE Access, Mar. 21, 2018.

* cited by examiner

METHOD, APPARATUS AND SYSTEM FOR PROCESSING AN ACCESS REQUEST IN A CONTENT DELIVERY SYSTEM

CROSS-REFERENCE TO RELATED APPLICATIONS

The present application is a national stage entry under 35 U.S.C. § 371 of International Application No. PCT/CN2020/103439, filed on Jul. 22, 2020, which claims priority to Chinese Patent Application No. 201910694947.X, titled "METHOD, APPARATUS AND SYSTEM FOR PROCESSING AN ACCESS REQUEST IN A CONTENT DELIVERY SYSTEM," filed to the State Intellectual Property Office of People's Republic of China on Jul. 30, 2019, which are incorporated herein by reference in their entirety.

TECHNICAL FIELD

The present application relates to, but is not limited to, the field of communications, and in particular to a method, apparatus and system for processing an access request in a content delivery system.

BACKGROUND

The Content Delivery Network (CDN), the purpose of this network is to avoid bottlenecks and links on the Internet that may affect the speed and stability of data transmission, so that content transmission is faster and more stable. As an intelligent virtual network based on the existing Internet and including node severs placed at various places in the network, the CDN system can redirect in real time a request from a user to a service node closest to the user according to the network traffic, the connectivity and loads of nodes, the distances to the user, the response times, etc., so that the user can obtain the desired content nearby. The network congestion of the Internet is solved, and the response speed for the user to access the website is improved.

In a content delivery network, in order to ensure resource redundancy and fault backup, it is common to use dozens or hundreds of cloud delivery edge nodes to provide file caching services for a same customer and a same business; moreover, for resource files for one business, there is always a situation where unpopular resource files and hot resource files are mixed and difficult to be distinguished. Therefore, in an actual production environment, multiple end customers may randomly request a same unpopular file from multiple edge nodes. As a result, all the multiple edge nodes need to request a same unpopular file from their upstream nodes. In addition, the unpopular resource files are almost never accessed again after being cached.

These two scenarios will lead to a lot of bandwidth cost consumption and storage resource consumption in a cloud content delivery network, resulting in the waste of network resources.

SUMMARY

In order to overcome the problems in related technologies, the present application provides a method, apparatus and system for processing an access request in a content delivery system.

According to a first aspect of the present application, a method for processing an access request in a content delivery system is provided, comprising:

obtaining a file access request;

judging, according to a preset unpopular file judgment policy, whether a file corresponding to the file access request is an unpopular file, to obtain a judgment result;

judging, if the judgment result shows that the file is an unpopular file, and according to bandwidth usage state information obtained in advance, whether the bandwidth usage state information conforms to a preset judgment policy for a full use of a bandwidth, to obtain a judgment result; and triggering, when the judgment result shows that the bandwidth usage state information conforms to the judgment policy, an unpopular file management node to respond to the file access request, wherein the unpopular file management node stores the file corresponding to the file access request.

Wherein, the judging, according to a preset unpopular file judgment policy, whether a file corresponding to the file access request is an unpopular file, to obtain a judgment result comprises:

searching, among locally stored files, a file corresponding to file identification information; and determining, if the file is not found among the locally stored files, a state of the file according to a judgment policy for a popularity of a file obtained in advance.

Wherein, the judging, according to bandwidth usage state information obtained in advance, whether the bandwidth usage state information conforms to a preset judgment policy for a full use of a bandwidth, to obtain a judgment result comprises:

obtaining a first number of file access requests to which the unpopular file management node has been triggered to respond and a total number of file access requests obtained;

judging, according to the first number and the total number, whether proportion information of the first number in the total number conforms to a preset judgment policy for an excessive proportion; and determining, if the proportion information does not conform to the judgment policy for an excessive proportion, that the bandwidth usage state information conforms to the judgment policy for a full use of a bandwidth.

Wherein, the triggering an unpopular file management node to respond to the file access request comprises:

obtaining, when there are at least two unpopular file management nodes, region information and/or operator network information used to transmit information for each unpopular file management node;

selecting, according to the region information and/or operator network information for each unpopular file management node, a target unpopular file management node, the target unpopular file management node conforming to local region information and/or operator network information; and controlling the target unpopular file management node to respond to the file access request.

Wherein, the selecting, according to the region information and/or operator network information for each unpopular file management node, a target unpopular file management node, the target unpopular file management node conforming to local region information and/or operator network information comprises:

obtaining domain name resolution information corresponding to the file access request; and determining, according to the domain name resolution information and the region information and/or operator network information for each unpopular file management node, an unpopular file management node matching the domain name resolution information among the unpopular file management nodes as the target unpopular file management node.

According to a second aspect of the present application, an apparatus for processing an access request in a content delivery system is provided, comprising:

an obtaining module configured to obtain a file access request;

a first judgment module configured to judge, according to a preset unpopular file judgment policy, whether a file corresponding to the file access request is an unpopular file, to obtain a judgment result;

a second judgment module configured to judge, if the judgment result shows that the file is an unpopular file, and according to bandwidth usage state information obtained in advance, whether the bandwidth usage state information conforms to a preset judgment policy for a full use of a bandwidth, to obtain a judgment result; and a processing module configured to trigger, when the judgment result shows that the bandwidth usage state information conforms to the judgment policy, an unpopular file management node to respond to the file access request, wherein the unpopular file management node stores the file corresponding to the file access request.

Wherein, the first judgment module comprises:

a searching unit configured to search, among locally stored files, a file corresponding to file identification information; and a first obtaining unit configured to determine, if the file is not found among the locally stored files, a state of the file according to a judgment policy for a popularity of a file obtained in advance.

Wherein, the second judgment module comprises:

a second obtaining unit configured to obtain a first number of file access requests to which the unpopular file management node has been triggered to respond and a total number of file access requests obtained;

a judgment unit configured to judge, according to the first number and the total number, whether proportion information of the first number in the total number conforms to a preset judgment policy for an excessive proportion; and a determination unit configured to determine, if the proportion information does not conform to the judgment policy for an excessive proportion, that the bandwidth usage state information conforms to the judgment policy for a full use of a bandwidth.

Wherein, the processing module comprises:

a third obtaining unit configured to obtain, when there are at least two unpopular file management nodes, region information and/or operator network information used to transmit information for each unpopular file management node;

a selection unit configured to select, according to the region information and/or operator network information for each unpopular file management node, a target unpopular file management node, the target unpopular file management node conforming to local region information and/or operator network information; and a control unit configured to control the target unpopular file management node to respond to the file access request.

Wherein, the selection unit comprises:

an obtaining sub-module configured to obtain domain name resolution information corresponding to the file access request; and a determination sub-module configured to determine, according to the domain name resolution information and the region information and/or operator network information for each unpopular file management node, an unpopular file management node matching the domain name resolution information among the unpopular file management nodes as the target unpopular file management node.

According to another aspect of the present application, a content delivery system is provided, comprising:

an edge node, comprising the apparatus described above; and an unpopular file management node configured to respond to a file access request.

Wherein, the system further comprises:

a decision-making center configured to obtain file access information in a file access request that occurs within a preset period of time and/or network bandwidth usage information corresponding to the file access request, and according to the file access information and/or network bandwidth usage information, determine a judgment policy for a popularity of a file, and then send the judgment policy for a popularity of a file to the edge node.

The unpopular file management node is configured to respond a file access request with a corresponding file in a local storage space if the file corresponding to the file access request is found locally, and request the file corresponding to the file access request from an upstream node if the file corresponding to the file access request is not found locally;

Wherein, the system further comprises:

an upstream node configured to obtain a corresponding file from a local storage space upon receiving a request for a file from an unpopular file management node, and send the corresponding file to the unpopular file management node.

Wherein, the unpopular file management node is configured to obtain proportion information of file access requests to which the unpopular file management node is triggered to respond by the edge node and all file access requests obtained, and determine a capacity of a storage pool of the unpopular file management node according to the proportion information and a capacity of a storage pool of the edge node.

According to another aspect of the present application, there is provided a computer-readable storage medium having a computer program stored thereon, and the computer program, when executed by a processor, implements the method described above.

According to another aspect of the present application, a computer device is provided, comprising a processor, a memory, and a computer program stored on the memory, and the computer program, when executed by the processor, implements the method described above.

In the present application, a file access request is obtained; it is judged, according to a preset unpopular file judgment policy, whether a file corresponding to the file access request is an unpopular file, to obtain a judgment result; it is judged, if the judgment result shows that the file is an unpopular file, and according to bandwidth usage state information obtained in advance, whether the bandwidth usage state information conforms to a preset judgment policy for the full use of the bandwidth, to obtain a judgment result; and when the judgment result shows that the bandwidth usage state information conforms to the judgment policy, an unpopular file management node is triggered to respond to the file access request. By judging whether an unpopular file management node is triggered to respond to a file access request for an unpopular file, the forwarding of local file access requests to other nodes is effectively controlled, thereby controlling the number of forwarded requests. The file processing efficiency is improved while ensuring the full utilization of the local resources.

It should be understood that, the aforementioned general description and detailed description hereinafter are merely exemplary and explanatory, and the present application is not limited thereto.

BRIEF DESCRIPTION OF THE DRAWINGS

The accompanying drawings illustrated herein, which constitute part of the present application, are used to provide further understanding of the present application, and exemplary embodiments of the present application and the description thereof are used to explain the present application and not intended to inappropriately limit the present application. In the drawings.

DETAILED DESCRIPTION

The technical solutions in the embodiments of the present application will be described clearly and completely with reference to the accompanying drawings in the embodiments of the present application. Apparently, the embodiments to be described are some embodiments of the present application, rather than all embodiments of the present application. Based on the embodiments of the present application, all other embodiments obtained by a person of ordinary skill in the art without paying any creative effort are included in the protection scope of the present application. It is to be noted that the embodiments of the present application and features in the embodiments may be combined if not conflict.

In view of the above situation, it was found that the reason for the waste of resources in the related technologies is the planning of resource usage in the cloud delivery network in the related technologies. Generally, first, the required resource pool is planned according to the customers' business volume, and the planned resource pool is provided to end customers for their accessing. No attention is paid to the popularity of files in the customers' businesses.

Since no attention is paid to the popularity of files, following resource wastes will be caused in the content delivery network, including:

when multiple end customers access an unpopular resource file on multiple edge nodes, the edge nodes each need to request a resource file from their upstream nodes, resulting in great bandwidth resource consumption; and when multiple end customers access an unpopular resource file on multiple edge nodes, the edge nodes each need to cache a resource file locally, resulting in great storage resource consumption.

Based on the technical analysis provided by the inventor, the present application provides the following solutions, including:

An exemplary embodiment of the present application provides a content delivery system, comprising:

an edge node, comprising an apparatus for processing an access request in a content delivery system, wherein the apparatus is configured to obtain a file access request; judge, according to a preset unpopular file judgment policy, whether a file corresponding to the file access request is an unpopular file, to obtain a judgment result; judge, if the judgment result shows that the file is an unpopular file, and according to bandwidth usage state information obtained in advance, whether the bandwidth usage state information conforms to a preset judgment policy for the full use of the bandwidth, to obtain a judgment result; and trigger, when the judgment result shows that the bandwidth usage state information conforms to the judgment policy, an unpopular file management node to respond to the file access request; and an unpopular file management node, configured to respond to the file access request, wherein the unpopular file management node stores the file corresponding to the file access request.

In an exemplary embodiment, the edge node is a node in the cloud delivery network, which is configured to cache the content from the customer's origin server, and a node that can quickly respond to requests from users in different regions. In the content delivery system, each edge node may be configured with the apparatus, or, some of edge nodes may be configured with the apparatus.

In an exemplary embodiment, the system may further comprise an upstream node, connected to the edge node, and configured to provide data services for the edge node. The upstream node may be the origin server of the customer; or, it may be a cloud delivery intermediate node (intermediate source), which is specifically used to serve the edge node in the cloud delivery process and configured to reduce part of the processing pressure of the edge node, thus to reduce the processing pressure of the origin server.

In an exemplary embodiment, the unpopular file management node is configured to store unpopular files in the content delivery system. The unpopular file management node may be an edge node which is an edge node for receiving unpopular resource file requests, receiving all requests judged as unpopular resources, and redirecting all requests judged as unpopular resources to the corresponding resource pool through the 302 technology. Similar to the maintenance method of edge nodes in the related technologies, the difference is that the stored data is all unpopular files in the content delivery system. When deploying an unpopular file management node, because the unpopular file management node can serve all edge nodes collectively, during the actual deployment of the unpopular file management node, preferably, one node is deployed to respond to all the edge nodes' requests for unpopular files. This saves the hardware cost. To select a node as an unpopular file management node, an edge node may be used as an unpopular file management node. In this way, the special management of unpopular files is realized while retaining the original system architecture, the versatility of the solution is improved, and the maintenance cost is reduced.

In an exemplary embodiment, the unpopular file management node is configured to obtain proportion information of file access requests to which an unpopular file management node is triggered to respond by the edge node and all file access requests obtained, and determine the capacity of a storage pool of the unpopular file management node according to the proportion information and the capacity of a storage pool of the edge node.

The resource pool of the unpopular file management node is configured to store files judged as unpopular resources. Since the bandwidth used by unpopular resource file requests to the total bandwidth is usually between 5% and 10%, the size of the resource pool is much smaller than the size of the resource pool of the edge node in the related technologies.

The result of judging whether a file is unpopular may be changed. When the business volume accessing unpopular files increases, the original unpopular resource files may become popular resource files; and when the business volume decreases, the original popular resource files may become unpopular resource files. For the files stored in the resource pool of the unpopular file management node, since the popularity of the files may be changed, the unpopular file management node stores files that conform to the current unpopular file judgment policy. For stored files that do not conform to the unpopular file judgment policy, they are deleted from the resource pool; and for non-stored files that conform to the unpopular file judgment policy, they are added to the resource pool of the unpopular file management node.

In an exemplary embodiment, the unpopular file management node is configured to respond the file access request with a corresponding file in a local storage space if the file corresponding to the file access request is found locally, and request the file corresponding to the file access request from an upstream node if the file corresponding to the file access request is not found locally;

Wherein, the system further comprises:

an upstream node configured to obtain a corresponding file from the local storage space after receiving a request for the file from an unpopular file management node, and send the corresponding file to the unpopular file management node.

The upstream node corresponding to the unpopular file management node may store unpopular files. When the unpopular file is not stored in the resource pool of the unpopular file management node, the response to the file access request is completed by obtaining the file from the upstream node. By deploying the upstream node, the storage pressure of the unpopular file management node may be reduced.

The present application proposes an unpopular file judgment policy to judge unpopular files, which is used to ensure that the files maintained by the unpopular file management node conform to the unpopular file determination policy and ensure that the unpopular file management node can accurately maintain unpopular files.

Wherein, the unpopular file judgment policy may be determined by a newly-added decision-making center in the system, or may be determined by the edge node itself according to the access situation.

In an exemplary embodiment, the system further comprises:

a decision-making center configured to obtain file access information in a file access request that occurs within a preset period of time and/or network bandwidth usage information corresponding to the file access request, and according to the file access information and/or network bandwidth usage information, determine a judgment policy for the popularity of a file, and then send the judgment policy for the popularity of the file to an edge node.

Based on the description of the decision-making center, it may be determined that the decision-making center has the following functions:

(1) Collection of customers' access data;

In an exemplary embodiment, the accessed file information, access time information, etc. are recorded.

(2) Collect the current operation situation of the separation scheduling for the popularity of files;

In an exemplary embodiment, the access data of the end customer is mainly analyzed by analyzing the end customers' access times to different resources, the generated access bandwidth, and the generated edge-to-upstream bandwidth. The proportion of requests for unpopular files (bandwidth) in the total requests (bandwidth) under different popularity judgment conditions, the reduced bandwidth used for returning to the upstream, and the reduced storage consumption for the edge node are predicted.

When there are n edge nodes in the entire network, if there are $N_{ij}$ files already accessed for j times on the $i_{th}$ edge node and the average file size is S, then, according to the above data, the following prediction data may be obtained when files with the number of accesses less than k are considered as unpopular files:

Proportion of the bandwidth for requests for unpopular files to the total bandwidth=bandwidth for unpopular files/total bandwidth=$\Sigma_{i=1 \to n}(\Sigma_{j=1 \to k}(N_{ij}*j))/\Sigma_{i=1 \to n}(\Sigma_{j=1 \to +\infty}(N_{ij}*j))$.

Reduced proportion of bandwidth used for returning to the upstream=reduced bandwidth used for returning to the upstream/original bandwidth used for returning to the upstream=$\Sigma_{i=1 \to n}(\Sigma_{j=1 \to k}(N_{ij}))/\Sigma_{i=1 \to n}(\Sigma_{j=1 \to +\infty}(N_{ij}))$.

In this case, the reduced storage consumption of the edge node is: $\Sigma_{i=1 \to n}(\Sigma_{j=1 \to k}(N_{ij}*S))$.

(3) Providing a judgment policy for the popularity of a file based on the access data and operating conditions;

In an exemplary embodiment, a judgment policy for popularity condition is provided based on the access data and operating conditions. The judgment policy may be that a file with a total number of accesses less than a certain value within a preset period of time is an unpopular file.

(4) Synchronization of the judgment policy for the popularity of a file to the edge nodes;

The judgment policy may be sent to all edge nodes together, or sent to all edge nodes in batches.

When the decision-making center is not used to determine the judgment policy for the popularity of a file, the judgment policy for the popularity of a file may be directly made by the edge node according to the end customers' access to the node and the node's unpopularity file separation condition, independent of the decision-making data of the decision-making center.

In the present application, the judgment policy for the popularity of a file may be determined by the edge or the decision-making center. The two methods are technically analyzed, specifically:

Generation of a judgment policy by the decision-making center: the file access situation in the entire network is collected and analyzed, the number of accesses to each file is counted, and a list of unpopular files or a list of popular files is generated and synchronized to the edge. Wherein, the content selected for synchronization is determined according to the number of lists. The smaller the data size, the lower the synchronization cost. After receiving the list of unpopular files (list of popular files), the edge node loads it into the service application. For each request from the end customer, a query is performed to determine whether the request is in the list of unpopular files (list of popular files). If the request is in the list of unpopular files (list of popular files), it is a request for unpopular files (request for popular files).

The advantage of this method is that, after the business changes, the decision-making center can perceive this change and adjust the policy. The judgment policy for the popularity of a file made by the decision-making center is more consistent with the data popularity of the entire business of the customer. Correspondingly, this method has disadvantages that the decision-making center needs to collect and analyze the access situation, which proposes high requirements for the decision-making center; and both the edge and the center need to maintain a large list of unpopular files (list of popular files). Because the judgment policy for the popularity of a file must have high timeliness and a guarantee mechanism needs to be provided, the maintenance cost is high. The central policy may not conform to all nodes even conforming to the entire access situation.

Generation of a judgment policy by making the decision by the edge: before the business goes online, the access situation in the entire network is collected for statistical analysis, and a judgment policy for the popularity of the file is made according to the popularity of the business and issued to the edge (for example, if 65% files in the entire network are accessed less than five times and the access bandwidth is about 10%, and if 25% files in the entire network are accessed more than twenty times and the access bandwidth is about 60%, then the judgment policy for the popularity of the file is that files accessed less than five times are unpopular files).

Making the decision by the edge: when the edge node accepts the request and fails to find the file in the local storage application, it checks the number of times the file has been accessed and the judgment policy for the popularity of the file (taking, as an example, files accessed less than five times being unpopular files). If the file is accessed less than five times, the request will be considered as a request for unpopular files and then redirected, and the number of accesses is added by 1. If the file is accessed more than five times, the request will be considered as a request for popular files. The advantage of this method is that the popularity of the file is updated in real time, and there is no need for central decision-making, which is easier for implementation and maintenance. There is no need to maintain and synchronize the list of unpopular files/list of popular files, and there may be fewer lists. The edge judges the popularity of the file according to the access situation, which better conforms to the serving condition of the node itself. Correspondingly, this method has disadvantages that the judgment policy for the popularity of the file cannot be automatically adjusted to adapt to new businesses when the customers' businesses change.

Based on the above analysis, it may be found that it is time-consuming for the decision-making center to collect the access data of the end customers in the content delivery system. Therefore, the storage of the obtained data is delayed. When determining the judgment policy for the popularity of a file by the obtained data, it is necessary to ensure the reliability and timeliness of the center to issue the policy to the edge, which is relatively complicated. In contrast, the centralized management by the center is more convenient, and a protection policy may be formulated. When an abnormality occurs in operation, the protection policy may be triggered by the center.

If the judgment policy for the popularity of a file is determined by the edge node, since each node can determine a judgment policy for the popularity of a file on the node, inconsistent judgment policies between nodes may be caused. As a result, a same file may be judged as a popular file or an unpopular file on different edge nodes. Consequently, disordered management is caused on the unpopular file management node. Correspondingly, the advantage of this method is that it can make full use of the computing power of the edge service, and the edge decision better conforms to the access characteristics of the end customer at the current node.

Combining the advantages and disadvantages of the two methods, a preliminary decision may be made regularly by the center, and on the basis of the preliminary decision, the edge makes the final decision according to the locally recorded popular and unpopular file information. The following solutions are proposed.

Generation of a policy by the decision-making center: the decision-making center regularly collects the access situation in the entire network for statistical analysis. The timing period may be set in hours. Since the probability of large changes in the business is low, high real-time performance is not required. According to the popularity of the business, the judgment policy for the popularity of a file is made and issued to the edge node. The difference from the above method is that no list of unpopular files/list of popular files is generated. The file accessed less than five times is determined as an unpopular file and the number of times is synchronized to the edge.

Making the decision by the edge: the edge updates the policy and the decision-making process is the same as the decision making by the edge.

By the cooperation of the decision-making center and the edge node, the implementation of the decision-making center is relatively simple, and high real-time performance is not required. When the customers' businesses change greatly, the center can update the policy and synchronize the policy to the edge.

The system in the exemplary embodiment of the present application use an unpopular file management node to centrally respond to requests for unpopular files, thereby reducing the bandwidth consumption when resources are requested from the upstream node for unpopular files, and also reducing the consumption of storage resources caused by caching unpopular files in multiple edge nodes, and reducing the access pressure of the upstream node server. In addition, due to the popularity of the accesses by the end customer, only a small part of requests needs to be redirected through the 302 technology. The hardware cost is low.

Figure 1:
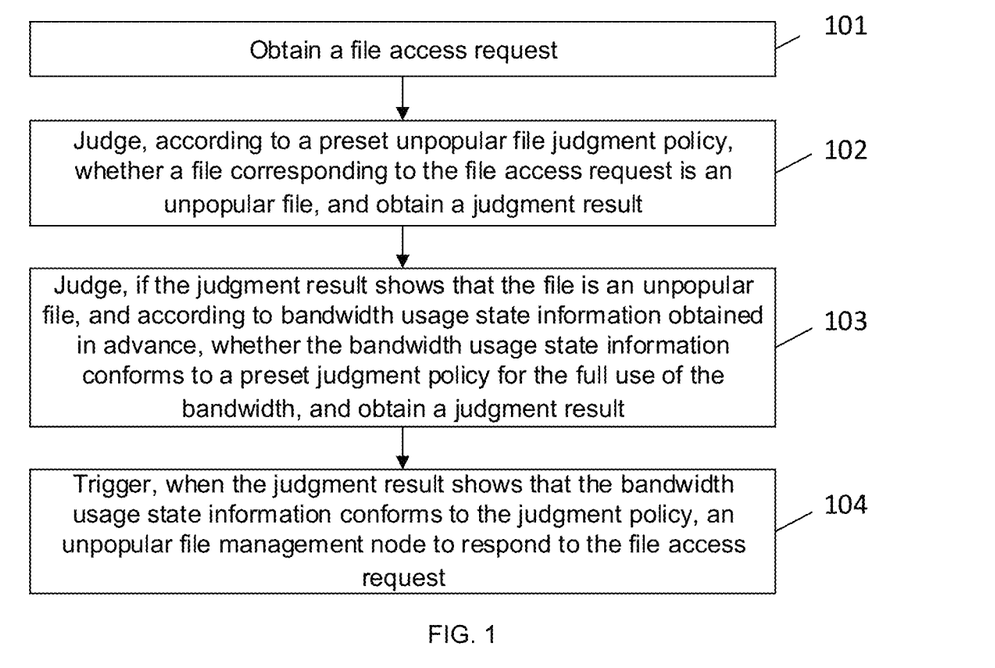
FIG. 1 is a flowchart of a method for processing an access request in a content delivery system according to an exemplary embodiment.

FIG. 1 is a flowchart of a method for processing an access request in a content delivery system according to an exemplary embodiment. The method shown in FIG. 1 comprises:

S101: A file access request is obtained.

In an exemplary embodiment, the file access request is a file access request sent by an end customer, and the file access request comprises identification information of a desired file.

S102: It is judged, according to a preset unpopular file judgment policy, whether a file corresponding to the file access request is an unpopular file, to obtain a judgment result.

In an exemplary embodiment, a corresponding file may be determined according to the identification information of the desired file in the file access request, and then according to the locally obtained unpopular file judgment policy, it is determined whether the file is an unpopular file.

S103: It is judged, if the judgment result shows that the file is an unpopular file, and according to bandwidth usage state information obtained in advance, whether the bandwidth usage state information conforms to a preset judgment policy for the full use of the bandwidth, to obtain a judgment result.

In an exemplary embodiment, the bandwidth usage state information may be determined by the bandwidth occupancy state, or the proportion of the number of requests locally processed to all requests.

By judging whether the unpopular file management node is triggered to respond to the file access request for unpopular files, the forwarding of local file access requests to other nodes is effectively controlled, thereby controlling the number of forwarded requests. The file processing efficiency is improved while ensuring the full utilization of the local resources.

S104: When the judgment result shows that the bandwidth usage state information conforms to the judgment policy, an unpopular file management node is triggered to respond to the file access request, wherein the unpopular file management node stores the file corresponding to the file access request.

In an exemplary embodiment, compared with the manner in which each edge node handles unpopular file requests individually in the related technologies, the solution of the present application is to uniformly hand over unpopular file requests received by the edge nodes to the unpopular file management node for processing. Therefore, the pressure of each edge node is reduced.

In the method embodiment of the present application, a file access request is obtained; it is judged, according to a preset unpopular file judgment policy, whether a file corresponding to the file access request is an unpopular file, to obtain a judgment result; it is judged, if the judgment result shows that the file is an unpopular file, and according to bandwidth usage state information obtained in advance, whether the bandwidth usage state information conforms to a preset judgment policy for the full use of the bandwidth, to obtain a judgment result; and when the judgment result shows that the bandwidth usage state information conforms to the judgment policy, an unpopular file management node is triggered to respond to the file access request. By judging whether an unpopular file management node is triggered to respond to a file access request for an unpopular file, the forwarding of local file access requests to other nodes is effectively controlled, thereby controlling the number of forwarded requests. The file processing efficiency is improved while ensuring the full utilization of the local resources.

The method in the embodiment of the present application will be described below.

In an exemplary embodiment, the judging, according to a preset unpopular file judgment policy, whether a file corresponding to the file access request is an unpopular file, to obtain a judgment result comprises:

searching, among locally stored files, a file corresponding to file identification information; and determining, if the file is not found among the locally stored files, the state of the file according to a judgment policy for the popularity of the file obtained in advance.

In an exemplary embodiment, first, a determination is made as to whether the file is stored locally from the storage application of the edge node, so as to use the locally stored file. Meanwhile, when the file is stored locally, the interaction with the upstream node and the unpopular file management node is reduced to some extent, the use of network bandwidth is reduced and the response speed to file access requests is improved.

In an exemplary embodiment, the judgment policy for the popularity of a file is obtained in the following manner, comprising:

recording file access requests received accumulatively within a preset period of time; and setting a the judgment policy for the popularity of a file according to the recorded file access requests.

In this exemplary embodiment, the edge node may determine the number of times each file has been accessed according to the files requested by the access requests recently, and obtain the number of times each file has been accessed to set the judgment policy for the popularity of a file.

In an exemplary embodiment, the judging, according to bandwidth usage state information obtained in advance, whether the bandwidth usage state information conforms to a preset judgment policy for the full use of the bandwidth, to obtain a judgment result comprises:

obtaining a first number of file access requests to which the unpopular file management node has been triggered to respond and a total number of file access requests obtained;

judging, according to the first number and the total number, whether the proportion information of the first number in the total number conforms to a preset judgment policy for the excessive proportion; and determining, if the proportion information does not conform to the judgment policy for the excessive proportion, that the bandwidth usage state information conforms to the judgment policy for the full use of the bandwidth.

A determination is made as to whether the proportion of redirected requests in the total requests is greater than a set threshold. If so, the request will not be redirected. In this way, the proportion of redirection operations is controlled:

Controlling the proportion of redirection operations avoids, if the customers' business is large in size or the node plan is changed, the redirection of a large number of requests intended to the node to other nodes to cause the node device and the node bandwidth to be underutilized, so as to ensure that the node device and the node bandwidth are fully utilized; in addition, controlling the number of file access requests responded by the unpopular file management node avoids the problem that the unpopular file management node receiving the redirection service cannot service normally due to request overload.

In addition, the threshold may be used to plan the size of the resource pool of unpopular file nodes. The threshold is determined according to the popularity of the business. Assuming that 10% of the files in the business are relatively unpopular files, the threshold may be set slightly greater than 10%, for example 12%.

In an exemplary embodiment, the triggering an unpopular file management node to respond to the file access request comprises:

obtaining, when there are at least two unpopular file management nodes, region information and/or operator network information used to transmit information for each unpopular file management node;

selecting, according to the region information and/or operator network information for each unpopular file management node, a target unpopular file management node that conforms to the local region information and/or operator network information; and controlling the target unpopular file management node to respond to the file access request.

The edge node considers the transmission performance between different operators or nodes in different regions. Therefore, for edge nodes in different operators or regions, it is necessary to consider using unpopular file management nodes in the same operator and in the same region or nearby regions to respond, in order to improve the transmission time of the request and improve the response efficiency.

In an exemplary embodiment, the selecting, according to the region information and/or operator network information for each unpopular file management node, a target unpopular file management node that conforms to the local region information and/or operator network information comprises:

obtaining domain name resolution information corresponding to the file access request; and determining, according to the domain name resolution information and the region information and/or operator network information for each unpopular file management node, an unpopular file management node matching the domain name resolution information among the unpopular file management nodes as the target unpopular file management node.

When the edge node obtains an unpopular file management node that may be used, it obtains the destination IP, to which the request can be redirected, through the agreed domain name resolved by the DNS, that is, the unpopular file management node that may be used in the region. For example, when an edge node in the Zhejiang Telecom needs to redirect a request, first, it requests for resolution of an agreed domain name. The unpopular node resolved by the domain name is the unpopular node that is configured for the operator Zhejiang Telecom and this region.

In an exemplary embodiment, the triggering an unpopular file management node to respond to the file access request comprises:

obtaining a server cluster in the unpopular file management node that responds to the file access request; and routing the file access request to the server cluster.

In an exemplary embodiment, a server cluster may be selected as the response object of the file access request according to a hashing policy for preset unpopular file cluster nodes. The method of triggering the request may be to route a file forwarding request to the unpopular file management node, so that the unpopular file management node knows the request.

In an exemplary embodiment, the routing the file access request to the server cluster comprises:

obtaining address information of the selected server cluster;

generating the file access request redirected to the selected server cluster according to the address information; and sending the redirected file access request.

In an exemplary embodiment, by redirecting the request, the unpopular file management node is triggered to respond, and also, the end customer is informed that the unpopular file management node will respond.

In an exemplary embodiment, the edge node may directly forward the file access request to the unpopular file management node, and then send a message to inform the end customer that the request is to be responded by the unpopular file management node.

Comparing the above two methods, there are two messages in the latter method, and the interaction method does not comply with the client-server message interaction method. Therefore, the former method is preferred.

In the method embodiment of the present application, due to the popularity of resource files accessed by the end customers, in the aid of the 302 technology, fewer edge node resources are used to serve the unpopular resource files. The bandwidth resource consumption and the storage resource consumption can be reduced effectively.

Figure 2:
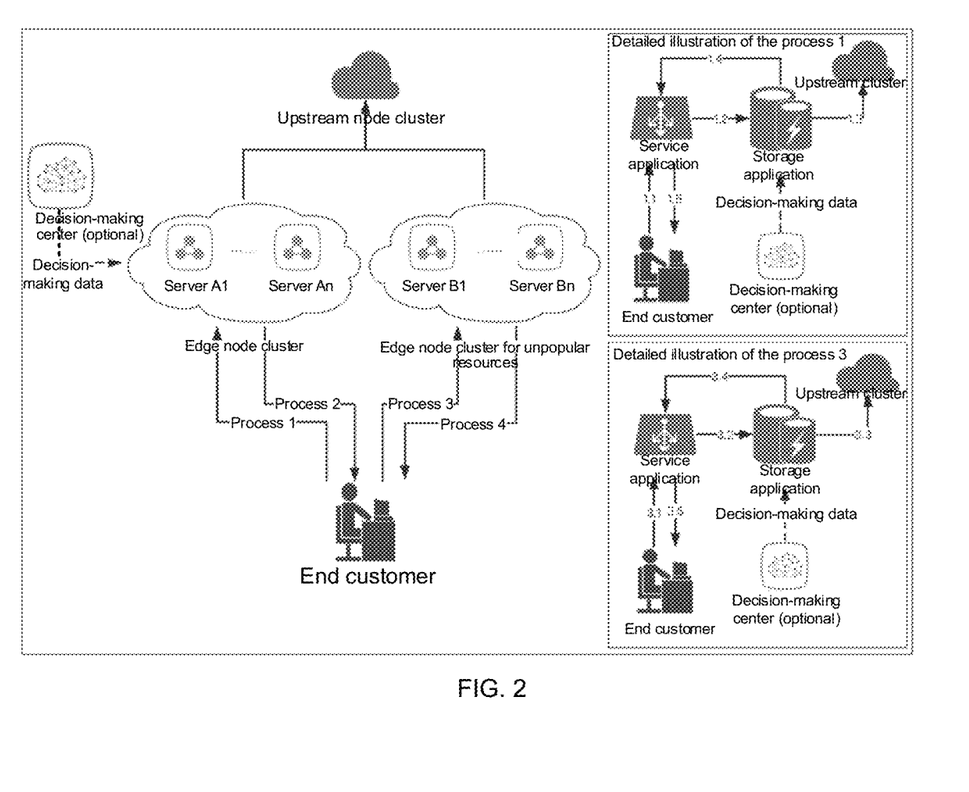
FIG. 2 is a schematic view of a method for processing an access request according to an exemplary embodiment.

FIG. 2 is a schematic view of a method for processing an access request according to an exemplary embodiment.

Combined with the system shown in FIG. 1, the present application provides a method for processing accesses by end customers, comprising the following processes and steps.

Process 1: The end customer initiates an access request to an edge node cluster.

S1.1: The end customer initiates an access request to the service application of an edge node server.

S1.2: The service application requests the local storage application for resource files accessed by the end customer.

S1.3: The storage application processes the request from the service application. There are three branches as follows:

1) If the resource file may be found locally, the local storage application reads and responds to the resource file; and the process ends.

2) If the resource file is not found locally and it is determined that this request is a popular resource request, the storage application requests the upstream node for the resource, caches the resource locally, and responds the service application with the resource.

3) If the resource file is not found locally and it is determined that this request is an unpopular resource request, the storage application returns information indicating that the resource is not found and the current request is determined to be an unpopular resource request.

S1.4: The service application accepts and processes the content responded by the storage application. There are two branches as follows:

1) If the storage application responds with the resource file, the resource file is directly responded to the end customer; and 2) if the storage application responds with information indicating that the resource is not found and the current request is determined to be an unpopular resource request, then, first, a server cluster in the edge node for the unpopular resource is selected by hashing; and then, the current request is redirected to the target cluster through the 302 technology.

Process 2: The server in the edge node cluster responds the request to the end customer. There are two branches as follows:

1) If the end customer receives a normal resource file, the current request ends normally; and 2) If the end customer receives a 302 skip request, the end customer continues using the URL redirected by the 302 technology.

Process 3: The end customer continues requesting the URL for the 302 technology.

S3.1: The end customer initiates an access request to the service application of an edge node server for unpopular resources.

S3.2: The service application requests the local storage application for resource files accessed by the end customer.

S3.3: The storage application processes the request from the service application. There are two branches as follows:

1) If the resource file may be found locally, the local storage application reads and responds to the resource file; and 2) If the resource file is not found locally, then the storage application requests the upstream node for the resource, caches the resource locally, and responds the service application with the resource.

S3.4: The service application accepts and processes the content responded by the storage application.

Process 4: The server in the edge node cluster for unpopular resources responds the end customer with the result.

Figure 3:
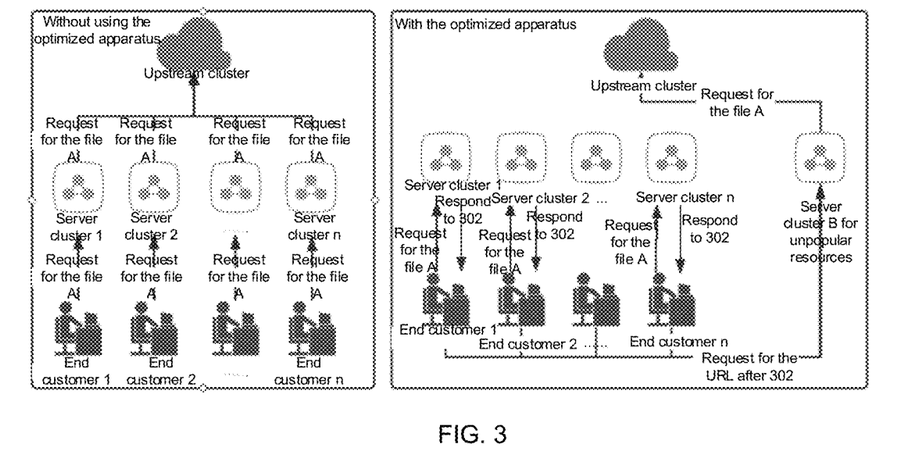
FIG. 3 is a schematic comparison view of a method for processing an access request according to an exemplary embodiment.

FIG. 3 is a schematic comparison view of a method for processing an access request according to an exemplary embodiment. In the schematic diagram shown in FIG. 3, the method for processing random requests, from multiple end customers and to the server cluster in the edge node, for an unpopular file A comprises:

Without the optimized apparatus, each server cluster needs to request the upstream node for the unpopular resource file A for one time; and each server cluster needs to cache the unpopular resource file A in the local cluster.

With the optimized apparatus, the request will be redirected to a fixed unpopular resource server cluster B, and only the unpopular resource server cluster B needs to request the upstream node for the unpopular resource file A for one time; and the unpopular resource file A needs to be cached only in the unpopular resource server cluster B.

By comparison, it may be found that, by the method of the present application, due to the popularity of resource files accessed by the end customers, in the aid of the 302 technology, fewer edge node resources are used to serve the unpopular resource files. The bandwidth resource consumption and the storage resource consumption can be reduced effectively.

Figure 4:
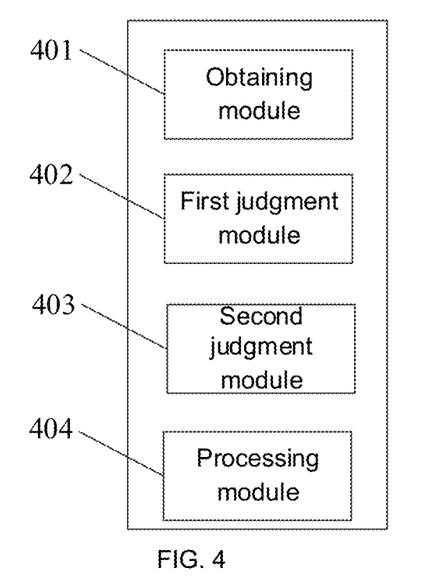
FIG. 4 is a schematic view of an apparatus for processing an access request in a content delivery system according to an exemplary embodiment.

FIG. 4 is a schematic view of an apparatus for processing an access request in a content delivery system according to an exemplary embodiment. As shown in FIG. 4, the apparatus comprises:

an obtaining module 401 configured to obtain a file access request;

a first judgment module 402 configured to judge, according to a preset unpopular file judgment policy, whether a file corresponding to the file access request is an unpopular file, to obtain a judgment result;

a second judgment module 403 configured to judge, if the judgment result shows that the file is an unpopular file, and according to bandwidth usage state information obtained in advance, whether the bandwidth usage state information conforms to a preset judgment policy for the full use of the bandwidth, to obtain a judgment result; and a processing module 404 configured to trigger, when the judgment result shows that the bandwidth usage state information conforms to the judgment policy, an unpopular file management node to respond to the file access request, wherein the unpopular file management node stores the file corresponding to the file access request.

In an exemplary embodiment, the first judgment module 402 comprises:

a searching unit configured to search, among locally stored files, a file corresponding to file identification information; and a first obtaining unit configured to determine, if the file is not found among the locally stored files, the state of the file according to a judgment policy for the popularity of the file obtained in advance.

In an exemplary embodiment, the second judgment module 403 comprises:

a second obtaining unit configured to obtain a first number of file access requests to which the unpopular file management node has been triggered to respond and a total number of file access requests obtained;

a judgment unit configured to judge, according to the first number and the total number, whether the proportion information of the first number in the total number conforms to a preset judgment policy for the excessive proportion; and a determination unit configured to determine, if the proportion information does not conform to the judgment policy for the excessive proportion, that the bandwidth usage state information conforms to the judgment policy for the full use of the bandwidth.

In an exemplary embodiment, the processing module 404 comprises:

a third obtaining unit configured to obtain, when there are at least two unpopular file management nodes, region information and/or operator network information used to transmit information for each unpopular file management node;

a selection unit configured to select, according to the region information and/or operator network information for each unpopular file management node, a target unpopular file management node that conforms to the local region information and/or operator network information; and a control unit configured to control the target unpopular file management node to respond to the file access request.

In an exemplary embodiment, the selection unit comprises:

an obtaining sub-module configured to obtain domain name resolution information corresponding to the file access request; and a determination sub-module configured to determine, according to the domain name resolution information and the region information and/or operator network information for each unpopular file management node, an unpopular file management node matching the domain name resolution information among the unpopular file management nodes as the target unpopular file management node.

In the apparatus embodiment of the present application, a file access request is obtained; it is judged, according to a preset unpopular file judgment policy, whether a file corresponding to the file access request is an unpopular file, to obtain a judgment result; it is judged, if the judgment result shows that the file is an unpopular file, and according to bandwidth usage state information obtained in advance, whether the bandwidth usage state information conforms to a preset judgment policy for the full use of the bandwidth, to obtain a judgment result; and when the judgment result shows that the bandwidth usage state information conforms to the judgment policy, an unpopular file management node is triggered to respond to the file access request. By judging whether an unpopular file management node is triggered to respond to a file access request for an unpopular file, the forwarding of local file access requests to other nodes is effectively controlled, thereby controlling the number of forwarded requests. The file processing efficiency is improved while ensuring the full utilization of the local resources.

An exemplary embodiment of the present application provides a computer-readable storage medium having a computer program stored thereon that, when executed, implements the following steps of the method, comprising:

obtaining a file access request;

judging, according to a preset unpopular file judgment policy, whether a file corresponding to the file access request is an unpopular file, to obtain a judgment result;

judging, if the judgment result shows that the file is an unpopular file, and according to bandwidth usage state information obtained in advance, whether the bandwidth usage state information conforms to a preset judgment policy for the full use of the bandwidth, to obtain a judgment result; and triggering, when the judgment result shows that the bandwidth usage state information conforms to the judgment policy, an unpopular file management node to respond to the file access request, wherein the unpopular file management node stores the file corresponding to the file access request.

In an exemplary embodiment, the computer program implements, when executed, the judging, according to a preset unpopular file judgment policy, whether a file corresponding to the file access request is an unpopular file, to obtain a judgment result, comprising:

searching, among locally stored files, a file corresponding to file identification information; and determining, if the file is not found among the locally stored files, the state of the file according to a judgment policy for the popularity of the file obtained in advance.

In an exemplary embodiment, the computer program implements, when executed, the judging, according to bandwidth usage state information obtained in advance, whether the bandwidth usage state information conforms to a preset judgment policy for the full use of the bandwidth, to obtain a judgment result, comprising:

obtaining a first number of file access requests to which the unpopular file management node has been triggered to respond and a total number of file access requests obtained;

judging, according to the first number and the total number, whether the proportion information of the first number in the total number conforms to a preset judgment policy for the excessive proportion; and determining, if the proportion information does not conform to the judgment policy for the excessive proportion, that the bandwidth usage state information conforms to the judgment policy for the full use of the bandwidth.

In an exemplary embodiment, the computer program implements, when executed, the triggering the unpopular file management node to respond to the file access request, comprising:

obtaining, when there are at least two unpopular file management nodes, region information and/or operator network information used to transmit information for each unpopular file management node;

selecting, according to the region information and/or operator network information for each unpopular file management node, a target unpopular file management node that conforms to the local region information and/or operator network information; and controlling the target unpopular file management node to respond to the file access request.

In an exemplary embodiment, the computer program implements, when executed, the selecting, according to the region information and/or operator network information for each unpopular file management node, a target unpopular file management node that conforms to the local region information and/or operator network information comprises:

obtaining domain name resolution information corresponding to the file access request; and determining, according to the domain name resolution information and the region information and/or operator network information for each unpopular file management node, an unpopular file management node matching the domain name resolution information among the unpopular file management nodes as the target unpopular file management node.

The steps in the method according to the embodiment of the present application may be adjusted in order, merged, and deleted according to actual needs.

The unit modules involved in the method for processing an access request in the content delivery system according to the embodiment of the present application may be combined, divided, and deleted according to actual needs.

Figure 5:
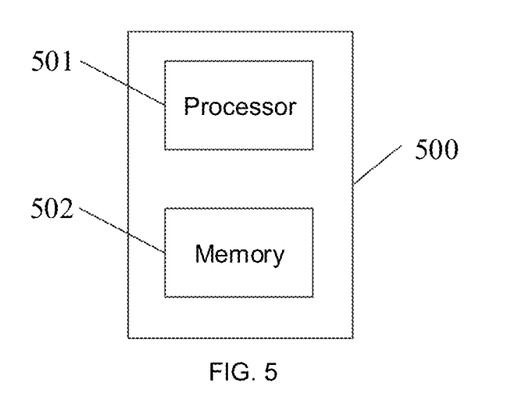
FIG. 5 is a block diagram of a computer device according to an exemplary embodiment.

FIG. 5 is a block diagram of a computer device 500 according to an exemplary embodiment. For example, the computer device 500 may be provided as a server. Referring to FIG. 4, the computer device 500 comprises a processor 501. One or more processors may be provided according to actual needs. The computer device 500 further comprises a memory 502 configured to store instructions executable by the processor 501, for example application programs. One or more memories may be provided according to actual needs. There may be one or more application programs stored in the memory. The processor 501 is configured to execute instructions to perform the method described above.

It may be understood by those skilled in the art that the embodiments of the present application may be provided as methods, apparatuses (devices), or computer program products. Therefore, the present application may be in the form of an only hardware embodiment, an only software embodiment, or an embodiment combining software and hardware. Moreover, the present application may be in the form of a computer program product implemented on one or more computer-usable storage media containing computer-usable program codes. The computer storage media comprise volatile and nonvolatile, removable and non-removable media implemented in any method or technology for storing information (for example computer-readable instructions, data structures, program modules, or other data), including but not limited to RAMs, ROMs, EEPROMs, flash memories or other memories, CD-ROMs, digital versatile disks (DVD) or other optical disk storages, magnetic cartridges, magnetic tapes, magnetic disk storages or other magnetic storage devices, or any other media that may be used to store desired information and may be accessed by a computer. In addition, as known to a person of ordinary skill in the art, the communication media usually contain computer-readable instructions, data structures, program modules, or other data in modulated data signals such as carriers or other transmission mechanisms, and may include any information delivery media.

The present application has been described with reference to flowcharts and/or block diagrams of the methods, apparatuses (devices) and computer program products according to embodiments of the present application. It should be understood that each flow and/or block in the flowchart and/or block diagram and the combination of flows and/or blocks in the flowchart and/or block diagram may be implemented by computer program instructions. These computer program instructions may be provided to the processors of general-purpose computers, special-purpose computers, embedded processors, or other programmable data processing devices to produce a machine, so that the instructions executed by the processors of the computers or other programmable data processing devices produce an apparatus that implements the functions specified in one or more flows in the flowchart and/or one or more blocks in the block diagram.

These computer program instructions may be stored in computer-readable memories that can direct computers or other programmable data processing devices to work in a specific manner, so that the instructions stored in the computer-readable memories produce an article of manufacture including the instruction apparatus. The instruction apparatus implements the functions specified in one or more flows in the flowchart and/or one or more blocks in the block diagram.

These computer program instructions may be loaded on computers or other programmable data processing devices, so that a series of operating steps are executed on the computers or other programmable devices to produce computer-implemented processing. Thus, the instructions executed on the computers or other programmable devices provide steps for implementing the functions specified in one or more flows in the flowchart and/or one or more blocks in the block diagram.

Herein, terms "comprise," "include" and variants thereof are intended to cover non-exclusive inclusion, so that an article or a device including a series of elements not only includes these elements, but also includes other elements not explicitly listed, or further includes inherent elements of the article or the device. Without further limitation, an element as defined by a statement "including a . . . " is not exclusive of additional identical elements in the article or the device of the element.

Although the preferred embodiments of the present application have been described, those skilled in the art can make additional changes and modifications to these embodiments once they learn the basic creative concept. Therefore, the appended claims are intended to be interpreted as comprising the preferred embodiments and all changes and modifications falling into the scope of the present application.

Apparently, those skilled in the art can make various modifications and variations to the present application without departing from the spirit and scope of the present application. In this way, if these modifications and variations of the present application fall into the scope of the claims of the present application and their equivalents, the present application is intended to encompass these modifications and variations.

INDUSTRIAL APPLICABILITY

In the present application, a file access request is obtained; it is judged, according to a preset unpopular file judgment policy, whether a file corresponding to the file access request is an unpopular file, to obtain a judgment result; it is judged, if the judgment result shows that the file is an unpopular file, and according to bandwidth usage state information obtained in advance, whether the bandwidth usage state information conforms to a preset judgment policy for the full use of the bandwidth, to obtain a judgment result; and when the judgment result shows that the bandwidth usage state information conforms to the judgment policy, an unpopular file management node is triggered to respond to the file access request. By judging whether an unpopular file management node is triggered to respond to a file access request for an unpopular file, the forwarding of local file access requests to other nodes is effectively controlled, thereby controlling the number of forwarded requests. The file processing efficiency is improved while ensuring the full utilization of the local resources.

The invention claimed is:

1. An access request processing method for a content delivery system comprising:
   obtaining a file access request;
   judging, according to a preset unpopular file judgment policy, whether a file corresponding to the file access request is an unpopular file;
   in response to determining that the file is an unpopular file, judging whether bandwidth usage state information obtained in advance conforms to a preset judgment policy for full use of bandwidth; and
   triggering, in response to determining that the bandwidth usage state information conforms to the judgment policy, an unpopular file management node to respond to the file access request, the unpopular file management node storing the file corresponding to the file access request;
   wherein judging whether the file corresponding to the file access request is an unpopular file includes: searching locally stored files for a file corresponding to file identification information; and determining, in response to the file corresponding to the file identification information being not found among the locally stored files, a state of the file corresponding to the file identification information according to a judgment policy for file popularity obtained in advance.

2. The method according to claim 1, wherein judging whether the bandwidth usage state information obtained in advance conforms to the preset judgment policy for full use of bandwidth includes:
   obtaining a first number of file access requests to which the unpopular file management node has been triggered to respond and a total number of file access requests already obtained;
   judging, according to the first number and the total number, whether proportion information indicating a ratio of the first number to the total number conforms to a preset judgment policy for excessive proportion; and
   determining, if the proportion information does not conform to the judgment policy for excessive proportion, that the bandwidth usage state information conforms to the judgment policy for full use of bandwidth.

3. The method according to claim 1, wherein triggering the unpopular file management node to respond to the file access request includes:
   obtaining region information and/or operator network information used to transmit information for each of at least two candidate unpopular file management nodes;
   selecting, according to the region information and/or the operator network information for each of the at least two unpopular file management nodes, a target unpopular file management node from the at least two unpopular file management nodes, the target unpopular file management node conforming to local region information and/or operator network information; and
   controlling the target unpopular file management node to respond to the file access request.

4. The method according to claim 3, wherein selecting the target unpopular file management node includes:
   obtaining domain name resolution information corresponding to the file access request; and
   determining, according to the domain name resolution information and the region information and/or the operator network information for each of the at least two unpopular file management nodes, an unpopular file management node matching the domain name resolution information among the unpopular file management nodes as the target unpopular file management node.

5. A computer-readable storage medium storing a computer program that, when executed by a processor, causes the processor to implement the method according to claim 1.

6. A computer device comprising:
   a processor; and
   a memory storing a computer program that, when executed by the processor, causes the processor to:
   obtain a file access request;
   judge, according to a preset unpopular file judgment policy, whether a file corresponding to the file access request is an unpopular file;
   in response to determining that the file is an unpopular file, judge whether bandwidth usage state information obtained in advance conforms to a preset judgment policy for full use of bandwidth; and trigger, in response to determining that the bandwidth usage state information conforms to the judgment policy, an unpopular file management node to respond to the file access request, the unpopular file management node storing the file corresponding to the file access request;

wherein the computer program further causes the processor to: search locally stored files for a file corresponding to file identification information; and determine, in response to the file corresponding to the file identification information being not found among the locally stored files, a state of the file corresponding to the file identification information according to a judgment policy for file popularity obtained in advance.

7. The device according to claim 6, wherein the computer program further causes the processor to:

obtain a first number of file access requests to which the unpopular file management node has been triggered to respond and a total number of file access requests already obtained;

judge, according to the first number and the total number, whether proportion information indicating a ratio of the first number to the total number conforms to a preset judgment policy for excessive proportion; and determine, if the proportion information does not conform to the judgment policy for excessive proportion, that the bandwidth usage state information conforms to the judgment policy for full use of bandwidth.

8. The device according to claim 6, wherein the computer program further causes the processor to:

obtain region information and/or operator network information used to transmit information for each of at least two candidate unpopular file management nodes;

select, according to the region information and/or the operator network information for each of the at least two unpopular file management nodes, a target unpopular file management node from the at least two unpopular file management nodes, the target unpopular file management node conforming to local region information and/or operator network information; and control the target unpopular file management node to respond to the file access request.

9. The device according to claim 8, wherein the computer program further causes the processor to:

obtain domain name resolution information corresponding to the file access request; and determine, according to the domain name resolution information and the region information and/or the operator network information for each of the at least two unpopular file management nodes, an unpopular file management node matching the domain name resolution information among the unpopular file management nodes as the target unpopular file management node.

10. A content delivery system comprising:
an unpopular file management node; and
a computer device including:
a processor; and
a memory storing a computer program that, when executed by the processor, causes the processor to:
obtain a file access request;

judge, according to a preset unpopular file judgment policy, whether a file corresponding to the file access request is an unpopular file;

in response to determining that the file is an unpopular file, judge whether bandwidth usage state information obtained in advance conforms to a preset judgment policy for full use of bandwidth; and trigger, in response to determining that the bandwidth usage state information conforms to the judgment policy, the unpopular file management node to respond to the file access request, the unpopular file management node storing the file corresponding to the file access request;

wherein the computer program further causes the processor to: search locally stored files for a file corresponding to file identification information; and determine, in response to the file corresponding to the file identification information being not found among the locally stored files, a state of the file corresponding to the file identification information according to a judgment policy for file popularity obtained in advance.

11. The system according to claim 10, further comprising:
a decision-making center configured to:

obtain file access information in a file access request that occurs within a preset period of time and/or network bandwidth usage information corresponding to the file access request;

according to the file access information and/or the network bandwidth usage information, determine a judgment policy for file popularity; and send the judgment policy for file popularity to an edge node.

12. The system according to claim 10, further comprising:
an upstream node;
wherein:
the unpopular file management node is configured to:

in response to the file corresponding to the file access request being found locally, respond to the file access request with the file corresponding to the file access request in a local storage space of the unpopular file management node; and in response to the file corresponding to the file access request being not found locally, request the file corresponding to the file access request from the upstream node; and the upstream node is configured to:

obtain the file corresponding to the file access request from a local storage space of the upstream node upon receiving a file request from an unpopular file management node; and send the file corresponding to the file access request to the unpopular file management node.

13. The system according to claim 10, wherein the unpopular file management node is configured to:

obtain proportion information of file access requests to which the unpopular file management node is triggered to respond by the edge node in all file access requests obtained; and determine a capacity of a storage pool of the unpopular file management node according to the proportion information and a capacity of a storage pool of the edge node.

* * * * *